United States Patent [19]
Patel et al.

[11] Patent Number: 5,113,275
[45] Date of Patent: May 12, 1992

[54] TEMPERATURE COMPENSATION OF LIQUID-CRYSTAL ETALON FILTERS

[75] Inventors: Jayantilal S. Patel, Red Bank; John R. Wullert, II, Colonia, both of N.J.

[73] Assignee: Bell Communications Research, Inc., Livingston, N.J.

[21] Appl. No.: 725,340

[22] Filed: Jul. 3, 1991

[51] Int. Cl.⁵ .............................................. G02F 1/13
[52] U.S. Cl. ........................................ 359/86; 359/85
[58] Field of Search ..................... 359/85, 86; 340/713

[56] References Cited

U.S. PATENT DOCUMENTS

| | | | |
|---|---|---|---|
| 3,921,162 | 11/1975 | Fukai et al. | 359/86 |
| 4,128,311 | 12/1978 | Smith et al. | 359/86 |
| 4,460,247 | 7/1984 | Hilsum et al. | 359/86 |
| 4,550,239 | 12/1985 | Katz | 359/86 |
| 4,625,163 | 11/1986 | Germer | 359/85 |
| 4,834,504 | 5/1989 | Garner | 359/85 |

OTHER PUBLICATIONS

J. S. Patel et al., "Electrically tunable optical filter for infrared wavelength using liquid crystals in a Fabry-Perot etalon," *Appl. Phys. Lett.*, Oct. 1990, vol. 57, No. 17, pp. 1718-1720.

Primary Examiner—Stanley D. Miller
Assistant Examiner—Huy K. Mai
Attorney, Agent, or Firm—Leonard Charles Suchyta; Charles S. Guenze

[57] ABSTRACT

A compensator for thermal or other uncontrollable effects in a liquid-crystal etalon filter. The narrow pass band of the filter is controlled by adjusting the amplitude of an AC drive signal applied to the electrodes on either side of the liquid crystal in the filter. An optical detector detects the intensity of light from a narrow-bandwidth input beam passed by the detector. Electrical circuitry determines the bipolar amplitude of the component of the light intensity that is at twice the frequency of the AC drive signal (the doubled-frequency amplitude) and adjusts the amplitude of the AC drive signal in response to the doubled-frequency amplitude so as to reduce the doubled-frequency amplitude toward zero.

13 Claims, 3 Drawing Sheets

TEMPERATURE COMPENSATION OF LIQUID-CRYSTAL ETALON FILTERS

FIELD OF THE INVENTION

The invention relates generally to liquid-crystal devices. In particular, the invention relates to temperature compensation of liquid-crystal etalon filters.

BACKGROUND ART

Electrically tunable, liquid-crystal, optical filters have been proposed, for example, by Patel et al. in "An electrically tunable optical filter for infra-red wavelength using liquids crystals in a Fabry-Perot etalon," *Applied Physics Letters*, volume 57, 1990, pp. 1718–1720 and by Patel in U.S. patent application, Ser. No. 07/677,769, filed Mar. 29, 1991. Although different types have been proposed, the high-performance types share the structure illustrated in FIG. 1 for a liquid-crystal etalon filter 10. Two dielectric interference mirrors 12 and 14 are formed on transparent substrates 16 and 18 as two separate assemblies. Semi-transparent electrodes 22 and 24 are deposited on the mirrors 12 and 14. The two assemblies are then fixed together with a small predetermined gap between them, and a liquid crystal 26 is filled into the gap. The size of the gap is chosen such that the corresponding optical length between the mirrors 12 and 14 (taking into account the relevant refractive index of the liquid crystal 26) nearly equals the wavelength of the light being filtered or a multiple thereof. That is, the mirrors 12 and 14 and intervening liquid crystal 26 form a Fabry-Perot cavity and thus an etalon filter for transmitted light. A voltage generator 28 electrically tunes the liquid-crystal by imposing a variable voltage, determined by a tuning signal TUNE, across the electrodes 22 and 24 and thus imposing an electric field across the liquid crystal 26. At least one of the refractive indices of the liquid crystal 26 is changed by the electric field. Thereby, the optical length of the resonant cavity is changed, and the filter 10 will pass an optical band of the input light 20 into an output light 30 in correspondence to the voltage imposed across it. This description has neglected alignment layers adjacent to the liquid crystal and polarizing components which vary among the various liquid-crystal filters, but preferred examples may be found in the Patel references.

A liquid-crystal filter of this type is not only easy to fabricate and to operate, it also offers a very narrow bandwidth of the order of 1 nm because of the high reflectivity (greater than 98%) and the low loss provided by the dielectric interference mirrors. However, this narrow bandwidth raises difficulties. The refractive indices of the liquid crystal depend not only on electric field but also upon the temperature of the liquid crystal. Some experiments, to be described later, have determined that a temperature variation of ±0.5° C. can shift the pass band by as much as half the width of the pass band. Although temperature can be controlled to these small variations, such controlling equipment is expensive and limits the usefulness of liquid-crystal etalon filters.

SUMMARY OF THE INVENTION

Accordingly, an object of the invention is remove the temperature dependence of a liquid-crystal optical filter.

Another object is to do so at minimal cost and without having to finely control the temperature.

The invention can be summarized as a method and apparatus of compensating for temperature and other variations in an electrically tunable liquid-crystal etalon filter by applying an electrical potential oscillating at the frequency $f$ across the electrodes of the liquid-crystal filter and adjusting the amplitude of the oscillatory potential so as to minimize the amplitude of one of the frequency components of a light beam passed by the filter. Preferably, this frequency component is the $2f$ component.

DETAILED DESCRIPTION OF THE PREFERRED EMBODIMENTS

Figure 1:
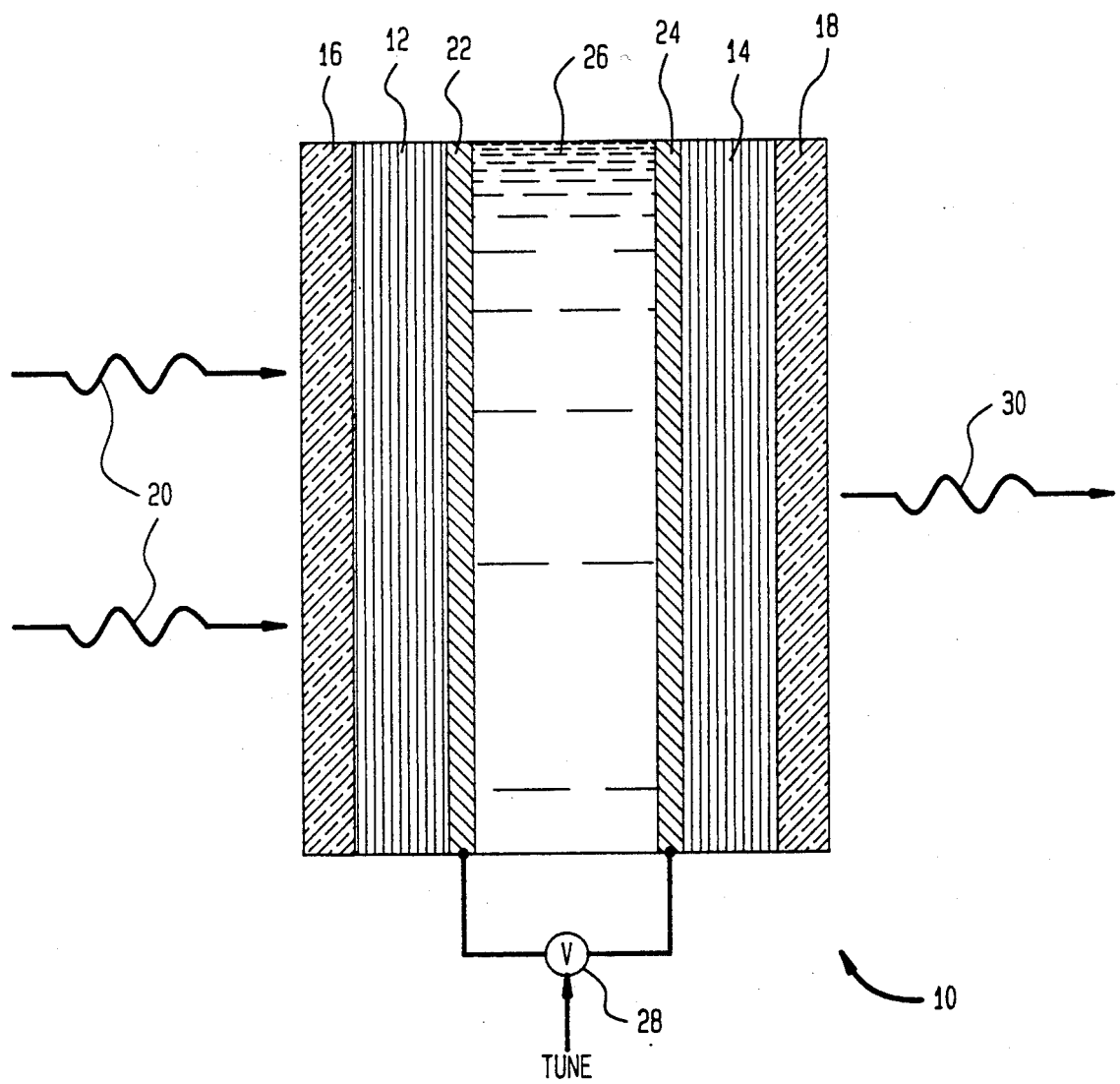
FIG. 1 is a cross-section of a liquid-crystal etalon filter.

It is standard practice to electrically bias a liquid crystal used in an optical modulator (display) or in an optical filter, not with a DC voltage, but with an AC voltage. A DC voltage causes charge migration in the liquid crystal resulting in a depolarization field that decreases the electric field across the liquid crystal as a function of time. As a result, the voltage generator 28 in FIG. 1 is an AC voltage generator producing an oscillatory signal of a generally fixed frequency $f$ and of an amplitude determined by the tuning signal TUNE. Typically in the prior art, the applied signal was a symmetrical bipolar square wave. For nematic liquid crystals, the dielectric torque on the liquid-crystal molecules is independent of the direction of the field since the torque is proportional to the square of the electric field. Consequently, the response should primarily depend on the RMS value of the applied voltage. However, at least two effects create an AC modulation by the applied AC voltage. First, ion migration causes time-dependent depolarization fields. Second, the flexo-electric effect causes structural relaxation and distortion of the director close to the surfaces. Both of these effects modulate the refractive index and result in a resonance peak having finitely sloped sides. When the filter is tuned on one of the sides, the transmitted intensity is modulated at twice the applied frequency, that is, at $2f$. However, the phase of the modulation changes by 180° when the resonance of a narrow-band liquid-crystal etalon filter is tuned from one side of a very narrow-band light source to the other side so that the $2f$ component disappears at the resonance peak. The signed amplitude of the $2f$ component represents the derivative of the resonance with respect to the applied voltage. In narrow-band filters, such an effect is generally undesirable. However, the invention uses this effect to tune to the peak of the resonance, which may be changing with temperature.

Figure 2:
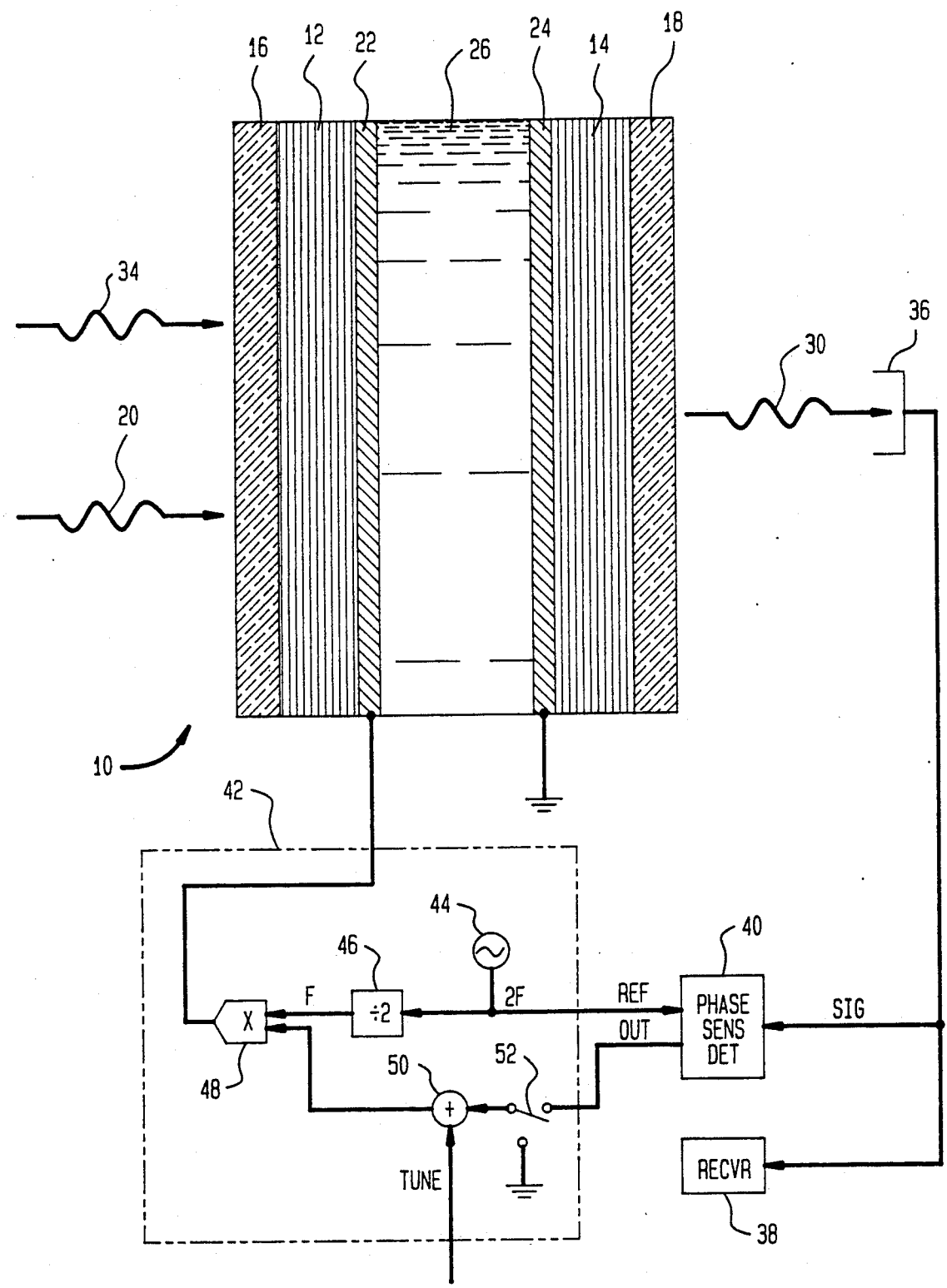
FIG. 2 is a schematic illustration of the circuitry of an embodiment of a temperature compensator of the invention for compensating variations associated with the illustrated liquid-crystal etalon filter.

In an embodiment of the invention illustrated schematically in FIG. 2, the temperature variation of the liquid-crystal etalon filter 10 is compensated by an active feedback circuit. It is initially assumed that the liquid-crystal filter 10, irradiated with an optical signal 34 preferably having a bandwidth less than the pass band of the filter 10, has its resonance at least partially tuned to the optical frequency of that signal 34.

The light 30 transmitted through the filter 10 is directly detected in an optical detector 36. The resulting electrical signal measures the intensity of the transmitted light 30 and may be directly received by a receiver 38 for which the data signal carried by the optical input signal 34 is intended. However, the electrical signal is also connected to the signal input SIG of a phase-sensitive detector 40 which has a frequency response at a considerably lower frequency than that of the receiver 38. The phase-sensitive detector 40 determines the component of the input signal SIG that is in phase with an oscillatory reference signal REF. Its output OUT is the signed amplitude of that oscillatory portion of the input signal SIG, although the output may be intentionally offset from zero. This signed amplitude represents an error signal.

A feedback and drive circuit 42 electrically drives the liquid-crystal filter 10 at a frequency $f$, generally about 1 kHz. Within it, an oscillator 44 produces an oscillatory output at the frequency $2f$. This oscillatory signal is connected not only to the reference input REF of the phase-sensitive detector 40 but also to a frequency divider 46 which outputs a signal at only half the frequency of its input. That is, the frequency divider 40 multiplies the input frequency $2f$ by 0.5 and outputs at the frequency $f$. The $f$ signal, having constant amplitude, is connected to one input of a multiplier 48. The other input of the multiplier 48 receives the error signal from the output OUT of the phase-sensitive detector 40, to which an analog adder 50 has added a DC tuning voltage TUNE. The output of the multiplier 50 drives the liquid-crystal filter 10 with an oscillatory signal having a frequency $f$ and an amplitude determined by the bipolar error signal from the phase-sensitive detector 34 and by the tuning voltage TUNE.

To initially tune the liquid-crystal filter 10 to the resonance corresponding to the input signal 34, a double-throw switch 52 substitutes a grounded potential for the output OUT of the phase-sensitive detector 40, and the tuning voltage TUNE is changed until the receiver 38 or other monitoring device detects that the filter 10 is passing the optical signal. Thereby, the cavity of the liquid-crystal filter 10 is at least partially tuned to the optical frequency of the optical input signal 34 under the conditions occurring during the tuning operations. Thereafter, the switch 52 is set back to the output OUT and feedback control starts.

Any non-zero output from the phase-sensitive detector 40 (that is, the presence of any detection signal at $2f$) indicates that the liquid-crystal filter 10 is not tuned to the peak of the resonance. The sign of the output OUT indicates on which side of the frequency of the resonance peak is the optical frequency of the optical input signal 34. The polarity of the output voltage signal OUT must be chosen so that the feedback and driver circuit 42 drives the resonance peak back to coincidence with the optical frequency of the optical input signal 34. The magnitude of the output signal OUT measures the amount of deviation between the resonance peak and the optical frequency.

The feedback control illustrated in FIG. 2 is proportional feedback control since the amount of the correcting signal OUT is proportional to the amplitude of the $2f$ signal. As a result, if the resonance has shifted, the compensation will be unable to return the liquid-crystal filter to the peak of the resonance, where there is no $2f$ signal, but will only return it toward the peak. More elaborate types of feedback control would eliminate this problem. For example, proportional-integral control would include partial control by a time integral of the correcting signal OUT. Yet more complex control would include a derivative term. Stability of the feedback loop must always be insured by inserting appropriate time constants.

The type of feedback control described above resembles well-known feedback control of a laser that is DC biased and is additionally biased by a small AC signal oscillating at a dither frequency. Then a detected signal is phase-sensitively detected at twice the dither frequency. The detected dither component then corrects the DC bias applied to the laser.

FEEDBACK AND DRIVE CIRCUIT

Figure 3:
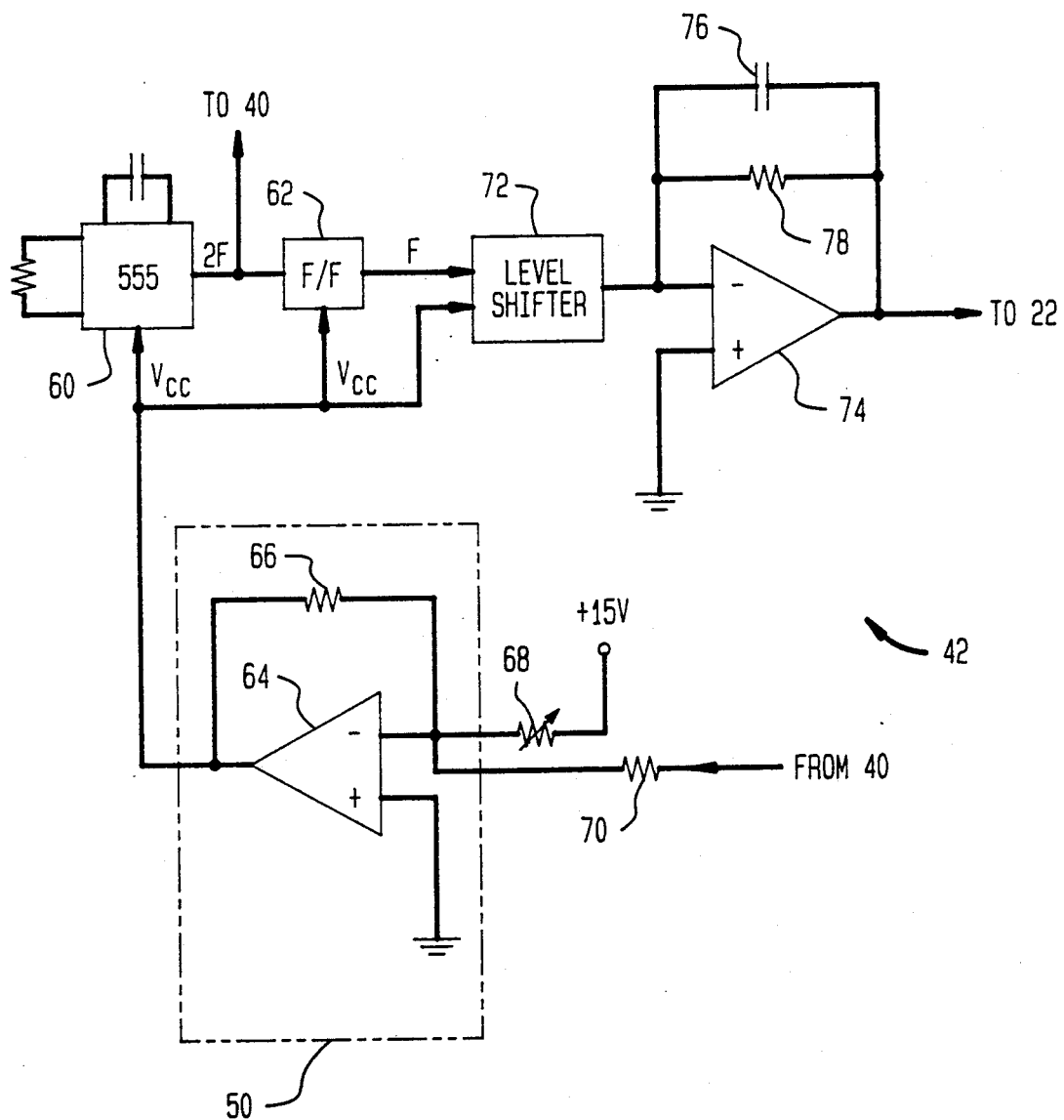
FIG. 3 is a schematic diagram of a preferred circuit of the feedback and drive circuit of FIG. 2.

A circuit 42 has been built to provide the feedback and driving functions illustrated in FIG. 2 but with different components, as illustrated in the schematic diagram of FIG. 3. A 555-type timer 60 was connected with capacitors and resistors so as to oscillate at 2 kHz with a 50% duty cycle. The 2 kHz output both is connected to the REF input of the phase-sensitive detector 40 and controls a D-type flip/flop 62, which acts as a frequency divider producing a signal at 2 kHz. The power supply inputs $V_{cc}$ of both the timer 60 and the flip-flop 62 are connected to the combined tuning and error signal from the adder 50. The adder 50 is an operational amplifier and feedback resistor 66 receiving the tuning signal TUNE from a voltage source through a variable resistor 68 and the error signal from the OUT output of the phase-sensitive detector 40 through a fixed resistor 70. Thus, the amplitudes of both the 1 kHz and the 2 kHz outputs depend on the tuning and error signal. The output of the flip/flop 62 is a symmetric 1 kHz square wave, but oscillating between the variable controlled amplitude and zero. A level shifter 72 shifts the square wave to be bipolar, oscillating between equal positive and negative voltages. The final stage of the level shifter 72 is an operational amplifier 74. When both a capacitor 76 and a resistor 78 are connected in parallel in its feedback loop, the operational amplifier 74 integrates the square wave input so as to output a bipolar triangular waveform. When the capacitor 76 is removed from the feedback loop, the operational amplifier 74 only amplifies its input signal so as to output a bipolar square wave.

EXPERIMENTS

A series of experiments were performed upon a liquid-crystal etalon filter fabricated as described in the Patel et al. article cited above. The mirrors had reflectivities of 98.5% in a broad band from 1.4 μm to 1.6 μm. The cell gap was about 10 μm, and the liquid crystal was nematic, Type E7, available from EM Chemicals. This liquid crystal has a transition from the nematic phase to the higher-temperature isotropic phase at 60.5° C. The pass band of the liquid-crystal 10 was about 0.5 nm. The filter was irradiated with laser light from a solid-state DFB laser operating at 1.5464 μm and having a line width considerably less than 0.5 nm. Single-mode fibers were coupled to each side of the filter. The filter was mounted on a temperature-controlled holder. An electronic amplifier was inserted between the optical detector and a PAR Model 121 lock-in amplifier, which acted as the phase-sensitive detector. The decay time on the lock-in amplifier was set to 3 seconds, which determined the feedback time constant.

A first experiment was performed with no feedback and using oscillators other than those in the feedback and drive circuit. Both the DC and $2f$ amplitude signals from the optical detector were monitored as a function of the amplitude of the AC drive signal at the frequency $f$. The DC signal showed two peaks at voltages for which the filter cavity was in resonance for the laser light. The $2f$ amplitude showed a positive peak immediately followed by a negative peak at these two voltages, that is, the $2f$ amplitude corresponded to the derivative of the DC signal. It was found that a sine wave or a triangular AC drive signal produced larger derivative signals than a square wave AC drive signal. Also the magnitude of the derivative signal decreased with increasing frequency $f$ of the AC drive signal. The frequency $f$ is picked so that the feedback loop is stably operated without severely affecting the detection of the optical signal being filtered.

A second experiment was performed with feedback, as illustrated in FIGS. 2 and 3, and using a triangular oscillatory waveform. The filter was initially tuned to resonance at 49° C., and then the feedback was turned on. The temperature was reduced to 25° C. and then gradually raised to above 65° C. The DC optical intensity remained fairly constant from 25° C. to just above 55° C., at which point it fell but remained locked until about 60° C. When the temperature was then lowered with the filter not being locked to the input signal, no output signal was obtained until the filter cavity came into an uncompensated resonance, from which point the intensity remained fairly constant down to 25° C.

A third experiment was performed using a bit-error ratio (BER) tester to impress pseudo-random data at 155 Mb/s upon the laser. The optical output signal was optically split between the optical detector of the BER tester and the optical detector of the temperature compensator. In order to reduce the size of the $2f$ amplitude, a square-wave drive signal was applied to the filter. After initial tuning, the BER was measured to be about $10^{-8}$ for a received laser power of $-37.6$ dBm. Thereafter, the BER was measured as a function of temperature with and without feedback control. Without any feedback, a temperature change of $\pm 0.5°$ C. from 25° C. caused the BER to increase to $10^{-2}$. With feedback, as the temperature was raised from 25° C. to 40° C., the BER gradually increased to about $10^{-3}$. Thereby, the temperature compensation of the invention extended the thermal operating range of the 0.5 nm filter by more than a factor of ten.

The tracking range of the temperature compensator used in the experiments is believed to be limited by the gain-bandwidth product of the feedback loop. However, increasing the loop gain of the described circuitry sends the loop into oscillation. The tracking range also depends on the parameters of the liquid crystal. The E7 liquid crystal melts at 60.5° C. Tracking is difficult even near the phase transition, where the change of refractive indices is most steep. A liquid crystal of higher melting point is desirable.

The last described experiment is related to a possible use of the liquid-crystal filter in a wavelength-division multiplexing communication systems in which multiple optical carriers are carried on a single optical fiber. The liquid-crystal filter would be tuned to the one desired optical carrier frequency. Thereafter, that carrier can be tracked by the temperature compensation of this invention as long as the carrier continues to carry enough energy to excite the temperature compensator. The initial tuning to that carrier frequency at an unknown driving voltage in the presence of other carriers will require an automatic scanning and recognition of a carrier identifier.

Although the described embodiment detected the doubled-frequency component at $2f$, other harmonics of the driving frequency $f$ can be detected and minimized. If the fundamental harmonic frequency $f$ is to be used, it is necessary to provide asymmetry with a DC bias or with asymmetrical surface alignment of the liquid crystal. Although the experiment has been described for the temperature compensation of a liquid-crystal filter, the invention can be used to compensate variations of the liquid-crystal filter caused by other factors, for example, variations in the drive circuit. Indeed, the invention can be used to compensate frequency drifts of the incoming light.

Although the invention involves temperature compensating the liquid-crystal by adjusting its biasing amplitude, it may be preferred to use biasing adjustment only for fine feedback control and for rough feedback control to control the actual temperature by resistive heating and thermoelectric cooling.

The temperature compensator of the invention is simple and inexpensively implemented. It requires no modification to the liquid-crystal filter and no application of additional signals to the filter. Nonetheless, it greatly extends the thermal operating range of a narrow-bandwidth liquid-crystal etalon filter.

What is claimed is:

1. A compensator for a liquid-crystal filter for filtering a beam of light having an optical frequency that is thereafter detected in an optical detector, comprising:
    an oscillator circuit providing a first oscillatory electrical signal at a driving frequency $f$ and a second oscillatory electrical signal at a frequency proportionally related to $f$;
    a phase-sensitive detector receiving a detection output from said optical detector and said second oscillatory electrical signal and providing a compensation signal representing an amplitude of a component of said detection output having said related frequency; and
    a driving circuit receiving said first electrical signal and said compensation signal and providing a driving signal for said liquid-crystal filter having said driving frequency and an amplitude related to said compensation signal.

2. A compensator as recited in claim 1, wherein said related frequency is $2f$.

3. A compensator as recited in claim 2, wherein said oscillator circuit comprises an oscillator providing an oscillator output and a frequency multiplier receiving said oscillator output.

4. A compensator as recited in claim 3, wherein said oscillator circuit includes a power supply input controlled in response to said compensation signal.

5. A compensator as recited in claim 1, wherein said driving circuit further receives a tuning signal and wherein said amplitude of said driving signal is related to an additive combination of said tuning signal and said compensation signal.

6. A compensated tunable optical receiver, comprising:

a liquid-crystal etalon filter receiving on a first side an optical signal and having electrodes for impressing a voltage across a liquid crystal in said filter;

an optical detector disposed on a second side of said filter, receiving a portion of said optical signal filtered by said filter, and providing a detection signal;

means for applying a first oscillatory signal at a frequency $f$ across said electrodes of said filter; and means for changing an amplitude of said first oscillatory signal according to an amplitude of a component of said detection signal at a frequency related to said frequency $f$.

7. A receiver as recited in claim 6, wherein said related frequency is $2f$.

8. A receiver as recited in claim 6, further comprising tuning means for tuning said filter to a peak of said optical signal independently of said changing means.

9. A method of compensating a liquid-crystal filter irradiated with a beam of light, comprising the steps of:
applying a first oscillatory signal at frequency $f$ across electrodes of said liquid-crystal filter;
detecting a component of said beam of light filtered by said filter and having a frequency proportionally related to said frequency $f$; and
a first step of adjusting said oscillatory signal in response to said detected component.

10. A method as recited in claim 9, wherein said detecting step detects an amplitude of said component in fixed phase relationship with a signal oscillating at said related frequency.

11. A method as recited in claim 10, wherein said related frequency is $2f$.

12. A method as recited in claim 11, wherein said detecting step comprises the steps of:
detecting an intensity of said beam of said light filtered by said filter;
generating a second oscillatory signal at said related frequency $2f$; and
detecting a component of said intensity having a fixed phase relationship with said second oscillatory signal and thereby providing said detected component.

13. A method as recited in claim 11, further comprising the steps of:
detecting said beam while said first adjusting step is disabled and thereby providing a measure of an intensity of said beam;
a second step of adjusting said oscillatory signal in response to said measure of said intensity of said beam; and
enabling said first adjusting step after said second adjusting step.

* * * * *